May 21, 1957 E. H. HARTEL 2,793,031
MULTI-STAGE LIQUID SPRING
Filed Dec. 24, 1954 2 Sheets-Sheet 1

INVENTOR.
ERWIN H. HARTEL
BY
ATTORNEY

INVENTOR.
ERWIN H. HARTEL
BY
ATTORNEY

United States Patent Office 2,793,031
Patented May 21, 1957

2,793,031

MULTI-STAGE LIQUID SPRING

Erwin H. Hartel, Cleveland, Ohio, assignor to The Cleveland Pneumatic Tool Company, Cleveland, Ohio, a corporation of Ohio Application December 24, 1954, Serial No. 477,449

8 Claims. (Cl. 267—64)

This invention relates generally to a spring device and more particularly to a compound liquid spring which may be used to produce two different spring rates.

In recent years there has been an increased use of liquid springs in landing gears for aircraft because of the ability of such springs to withstand large loadings without large bulky structures. In such landing gear installations it is often desirable to provide a spring having one spring rate through a first portion of the stroke and a second entirely different spring rate through another portion of the stroke so that the landing gear will have the desired static position and overstroke characteristics. A liquid spring according to this invention accomplishes this result by providing two separate chambers and valve means for isolating one of the chambers so that it will not affect the spring rate during one portion of the stroke but wherein the valve means is arranged to bring both chambers into operation at a predetermined point on the stroke to provide a new and different spring rate through the remainder of the stroke.

It is an important object of this invention to provide a liquid spring having two different spring rates wherein one spring rate is utilized through a first portion of the spring stroke and a second spring rate is utilized through a second portion of the stroke.

It is another important object of this invention to provide a liquid spring having two chambers, one of which can be isolated from the other during a portion of the stroke.

It is still another object of this invention to provide a liquid spring in combination with energy absorbing damping means wherein the spring rate may be changed at a predetermined point of the spring stroke.

Further objects and advantages will appear from the following description and drawings, wherein.

Liquid springs have come into increasing use in recent years in applications where a relatively small spring device must be utilized to provide large spring reactions. These springs depend upon the compressibility of liquids for operation and the spring rate of a given spring depends upon the relationship between the volume of liquid being compressed, the volume displaced for a given amount of stroke and the compressibility of the liquid.

Generally speaking, some adjustment of the spring rate may be achieved by the proper selection of the liquid used in the spring. However, in a conventional liquid spring, the type disclosed by the patent to Dowty, Patent No. 2,333,095, dated November 2, 1943, the spring rate once determined, follows an unbroken curve throughout the entire length of the stroke. In a liquid spring according to this invention, it is possible to achieve two different spring rates, one of which is effective through one portion of the stroke and the other which is effective through the remaining portions of the stroke. To accomplish this, a liquid spring is provided with two liquid chambers connected by valve means which are operated at a predetermined point in the stroke of the spring so as to change the volume of liquid being compressed and thereby change the spring rate of the entire device at a predetermined point in the stroke.

Figure 1:
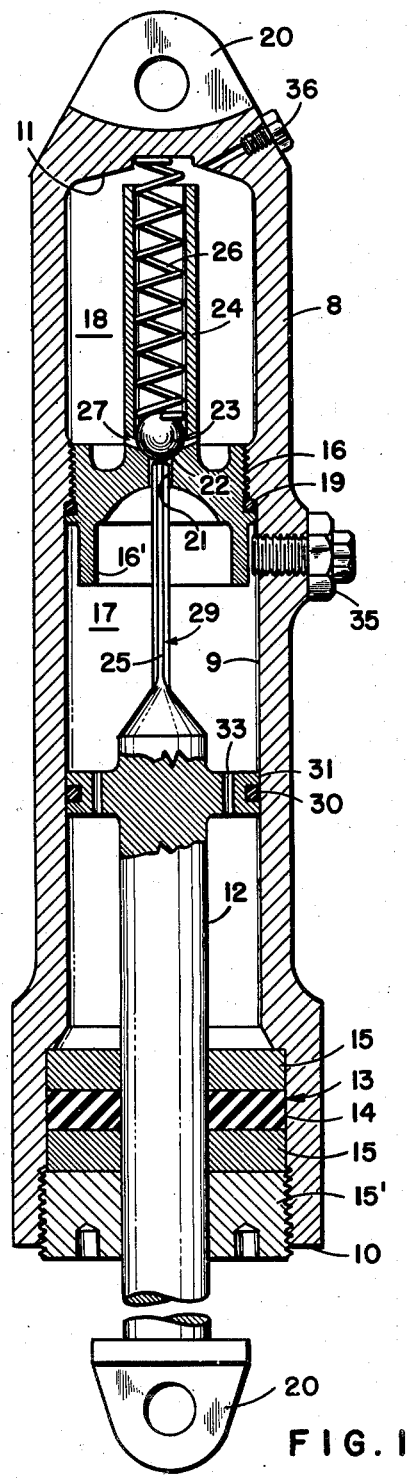
Figure 1 is a side elevation partially in longitudinal section of a liquid spring according to this invention showing the position of the elements just before the valve means are operated to change the volume of the reacting liquid.
Figure 2:
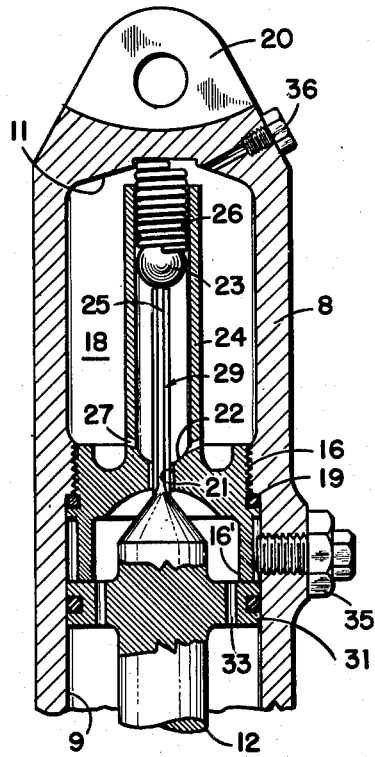
Figure 2 is a fragmentary partial cross section of the device shown in Figure 1 at the upper extreme end of the stroke.

For a clear understanding of this invention, reference should be made to the drawing wherein preferred forms of this invention are disclosed. The liquid spring of Figures 1 and 2 is provided with a cylindrical housing 8 having a longitudinal cavity 9 extending from the lower end 10 and terminating at the upper end in an end wall 11. A plunger 12 is mounted within cavity 9 for axial motion relative to the housing and is radially supported by a seal assembly 13. The seal assembly 13 provides a fluid seal between the housing 8 and the plunger 12 by means of a resilient packing 14 compressed between pressure plates 15 by a retainer 15' threaded into the end of the housing. For purposes of simplification, the structure of the associated equipment has not been shown since it forms no part of this invention. It should be understood, however, that when this spring is installed in a landing gear, for example, mounting terminals 20 on the housing 8 and the plunger 12 would be connected to the landing gear members in a manner which would cause the weight of the airplane to move the plunger into the cylinder.

A bulkhead 16 is threaded into the housing 8 and divides the cavity 9 into a first chamber 17 and a second chamber 18. A suitable seal 19 engages the wall of the housing 8 and the periphery of the bulkhead 16 to prevent leakage therebetween. The bulkhead 16 is formed with a central orifice 21 aligned with the plunger 12 and a valve seat 22 adapted to be engaged by a ball valve 23 which closes off the orifice 21 when seated. The bulkhead 16 is also formed with a cylindrical spring retaining portion 24 having an internal diameter larger than the ball valve 23 adapted to receive a spring 26 as well as guide the ball valve 23. The spring 26 extends between the end wall 11 and the ball valve 23 and urges the ball valve into engagement with the valve seat 22. Adjacent to the valve seat 22, the spring retaining portion 24 is provided with ports 27 to facilitate communication between the zone of the valve seat 22 and the second chamber 18.

Integrally formed on the upper end of the plunger 12 is a valve actuator 29 which is adapted to extend through the orifice 21 and engage the ball valve 23 to move it away from the valve seat 22 when the plunger reaches a predetermined point in its stroke. The valve actuator 29 is formed with fluting 25 so that fluid can flow through the orifice 21 even when the actuator projects therethrough. The plunger 12 is also formed with a damper head 31 which engages the inner wall of the chamber 17 and is provided with a seal 30 to prevent leakage of fluid around the damper head. The damper head 31 is formed with two or more orifices 33 which provide a restricted flow connection between the upper and lower sides of the damper head. An axially extending skirt 16 spaced from the housing 8 is formed on the bulkhead 16 and is proportioned to engage the damper head 31 and limit upward movement of the plunger 12. A fill plug 35 and bleed plug 36 are threaded in the housing 8 to close the apertures used for filling the device with oil.

In operation the chambers 17 and 18 are charged with oil or other liquid when the plunger 12 is at its extreme lower position. When the plunger 12 is moved upwardly into the chamber 17, during its first stroke after filling, there is a displacement of liquid within the chamber which reduces the volume of the oil and effects a compression thereof. This causes flow of oil past the ball valve 23 which maintains the pressure in the chamber 18 substantially equal to the pressure in the chamber 17. It should be understood that this compression is only effected by the plunger 12 itself and that the damper head 31 does not affect the oil pressure since it does not change the volume of the chamber 17. In fact flow of oil through the orifices 33 affects an equalization of the pressure on both sides of the damper head. As the plunger 12 returns to the extended position, the pressure in the two chambers 17 and 18 is equalized by flow through the orifice 21 until the position shown in Figure 1 is reached. At this time the ball valve 23 engages the valve seat 22 and pressure within the chamber 18 remains constant as the plunger 12 moves to the fully extended position even though the pressure in the chamber 17 drops. On all operating strokes after the first stroke, upward movement of the plunger 12 causes compression of only the liquid within the chamber 17 until the valve actuator 29 engages the ball valve 23 and moves it away from the valve seat 22 as shown in Figure 2. At this time communication is established between the chamber 17 and the chamber 18. Further upward movement of the plunger 12 causes an equal build up of the pressure in both of the chambers 17 and 18. When the plunger returns to its lower position the ball valve 23 engages the valve seat 22 in response to the force of the spring 26. This isolates the chamber 18 from the chamber 17 so the pressure in the chamber 18 remains at the pressure existing therein at the time the ball valve 23 engages the valve seat 22. The pressure in the chamber 18 is always equal to or greater than the pressure in the chamber 17 so any differential pressure which exists urges the valve 23 toward the seat 22 and thus insures an adequate seal.

Figure 3:
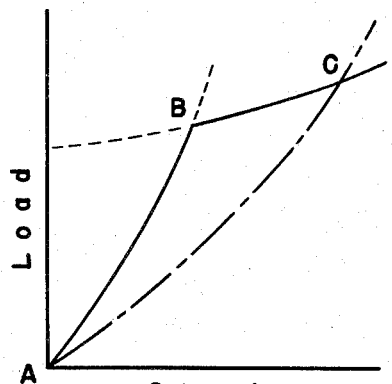
Figure 3 is a load stroke diagram showing the difference between a conventional liquid spring and the liquid spring shown in Figures 1 and 2; and, Figure 4 is a side elevation in longitudinal section showing a second embodiment of a liquid spring according to this invention.

Because the first portion of the stroke only effects a pressurization of the chamber 17, for any given liquid the spring rate during this portion of the stroke is determined by the ratio of the volume of the chamber 17 and the displacement of the plunger 12. The load stroke curve for this portion of the stroke is represented by the line AB in Figure 3. A change in the volume of oil compressed effects a change in the spring rate. Therefore, as soon as the ball valve 23 is moved away from the valve seat 22, the volume of the oil in both of the chambers 17 and 18 is compressed by the plunger movement and a lower spring rate results which is represented by the line BC in Figure 3. Line AC represents the load stroke curve which would result if a conventional design such as is shown in the Dowty patent cited above was used. By properly choosing the volume of the two chambers 17 and 18 and the dimensions of the plunger 12, it is possible to produce a liquid spring having essentially any desired spring rate through one portion of the stroke and an entirely different spring rate through other portions of the stroke.

During the movement of the plunger 12, the damper head moves axially in the chamber 17 and displaces liquid from one side of the damper head to the other through the orifices 33. Even though the damper head does not change the total volume and therefore does not effect any change in the pressure of the liquid in the chamber 17, it requires a flow of liquid through the orifices 33 which absorbs energy and damps motion of the plunger. The size of the orifices 33 and the amount of liquid that flows therethrough determines the amount of energy absorbed by the damper head. However, the pressure on both sides of the damper head equalizes when the plunger comes to rest so this damping action does not affect the ability of the spring to maintain a static load.

Figure 4:
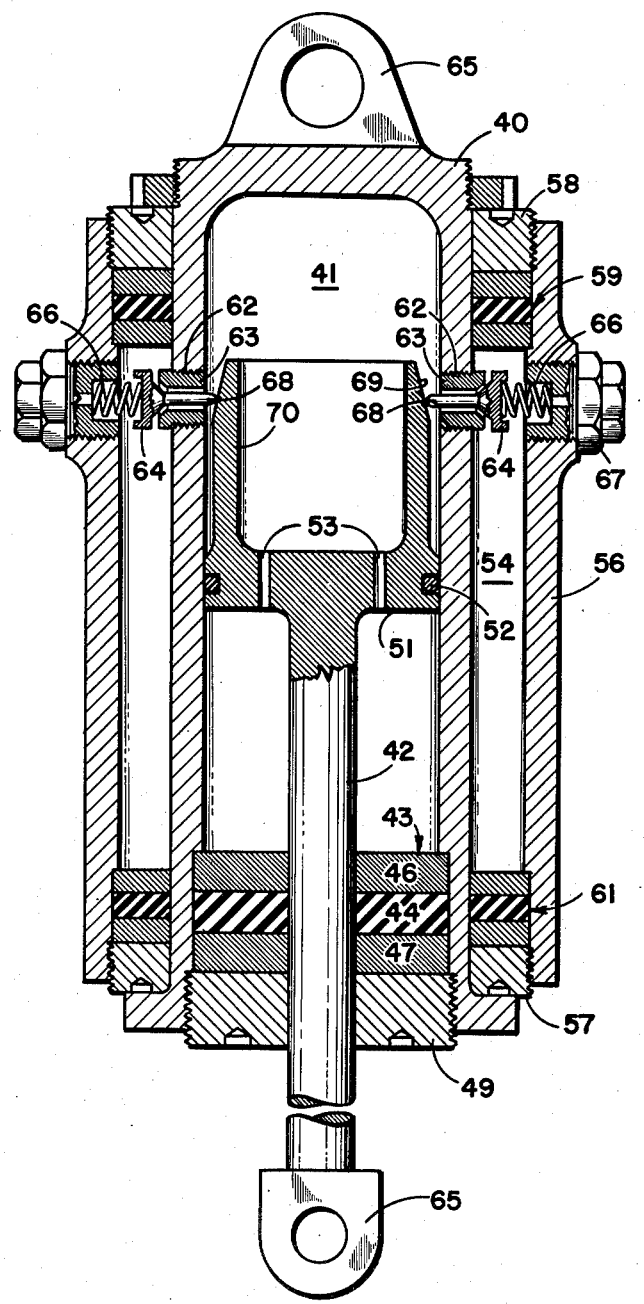

Figure 4 shows a second embodiment of this invention wherein a main housing 40 is provided with a cylindrical cavity 41 into which the plunger 42 projects. A seal assembly 43 provides a fluid seal between the walls of the housing 40 and the plunger 42 while permitting relative axial motion therebetween. The seal assembly 43 includes a resilient packing 44 positioned between pressure plates 46 and 47 which are secured by a retainer 49 threaded into the housing 40. The upper end of the plunger 42 is formed with a damper head 51 provided with a seal 52 engaging the main housing 40 and two or more orifices 53.

A second chamber 54 is defined by the main housing 40 and an outer housing 56 which is mounted around the main housing by means of retainers 57 and 58. Seal assemblies 59 and 61 provide a fluid seal between the outer housing 56 and the main housing 40 and are formed similar to the seal assembly 43. The main housing 40 is provided with two or more symmetrically arranged radially threaded apertures 62 in which valve seat bushings 63 are threaded. Valve members 64 are proportioned to fit against the valve bushings 63 and isolate the chamber 41 from the chamber 54. Springs 66 extend between the valve member 64 and the caps 67 and provide a bias on the valve members 64 urging them into the seating engagement with the bushings 63. The valve members 64 are also formed with projecting portions 68 which project through the valve seat bushings 63 and into the housing 40 proportioned to be engaged by a conical camming portion 69 formed integrally with the plunger 42. The camming portion 69 and the valve members 64 are proportioned so that the plunger 42 moves through a substantial portion of its stroke before the valve member 64 is cammed away from the valve seat bushings 63, to provide fluid communication between the chambers 41 and 54. The main cylindrical portion 70 is spaced from the inner wall of the main housing 40 so that the valve bushings 63 will not be blocked when the plunger moves to the upper position. Also the end of the camming portion 69 is proportioned to engage the upper end of the cavity 41 and limit the upward movement of the plunger. Terminals 65 on the main housing 40 and the plunger 42 are provided for mounting this spring on a landing gear structure or the like.

The operation of this embodiment is similar to the operation of the embodiment shown in Figures 1 and 2 since the fluid with the chamber 41 is compressed by the plunger movement until a predetermined point is reached. Then the valve member 64 is cammed away from the valve seat bushing 63 and further movement of the plunger creates increased pressures in both the chambers 41 and 54. This of course changes the spring rate during the latter portion of the plunger stroke.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A liquid spring comprising a housing assembly formed with at least two chambers filled with liquid, valve means between said chambers normally isolating said chambers, a plunger axially movable relative to said housing into one of said chambers, a fluid seal between said plunger and housing, actuating means on said plunger adapted to open said valve means and provide communication between said chambers when said plunger moves to a predetermined position.

2. A liquid spring comprising a housing assembly formed with at least two chambers filled with liquid, a port communicating between said chambers, normally closed valve means for closing said port and isolating said chambers, a plunger axially movable relative to said housing into one of said chambers, a fluid seal between said plunger and housing, actuating means on said plunger adapted to open said valve means and provide communication between said chambers when said plunger moves to a predetermined position.

3. A liquid spring comprising a housing formed with a longitudinal cavity, a bulkhead in said housing dividing said cavity into two chambers, a plunger axially movable relative to said housing projecting into one of said chambers, a liquid seal between said plunger and said housing, liquid filling both of said chambers, a port communicating between said chambers and a valve seat around said port on the side of said port remote from said plunger, a valve member resiliently urged into engagement with said seat for closing said port and isolating said chambers, a valve actuator on said plunger engageable with said valve member for moving said valve member away from said seat thereby establishing communication between said chambers when said plunger reaches a predetermined position.

4. A liquid spring comprising a housing formed with a longitudinal cavity, a bulkhead in said housing dividing said cavity into two chambers, a plunger axially movable relative to said housing projecting into one of said chambers, a liquid seal between said plunger and said housing, liquid filling both of said chambers, a port communicating between said chambers and a valve seat around said port on the side of said port remote from said plunger, a valve member resiliently urged into engagement with said seat for closing said port and isolating said chambers, a valve actuator on said plunger engageable with said valve member for moving said valve member away from said seat thereby establishing communication between said chambers when said plunger reaches a predetermined position, said plunger being formed with a damper head extending into engagement with the walls of said one chamber and restricted orifices providing communication between opposite sides thereof, a fluid seal between said damper head and the walls of said one chamber whereby axial motion of said plunger and damper head relative to said chamber displaces liquid in said one chamber from one side of said damper head to the other side thereof through said restricted orifices.

5. A liquid spring comprising a housing formed with a longitudinal cavity, a bulkhead in said housing dividing said cavity into two chambers, a plunger axially movable relative to said housing projecting into one of said chambers, a liquid seal between said plunger and said housing, liquid filling both of said chambers, said bulkhead being formed with a port communicating between said chambers and a valve seat around said port on the side of said bulkhead remote from said plunger, a valve member resiliently urged into engagement with said seat for closing said port and isolating said chambers, a valve actuator on said plunger engageable with said valve member for moving said valve member away from said seat thereby establishing communication between said chambers when said plunger reaches a predetermined position, said plunger being formed with a damper head extending into engagement with the walls of said one chamber and restricted orifices providing communication between opposite sides thereof, a fluid seal between said damper head and the walls of said one chamber whereby axial motion of said plunger and damper head relative to said chamber displaces liquid in said one chamber from one side of said damper head to the other side thereof through said restricted orifices.

6. A liquid spring comprising a main housing formed with a longitudinal cavity, a plunger axially movable relative to said main housing projecting into said cavity, a liquid seal between said main housing and plunger cooperating with said main housing and plunger to define a first chamber, a second housing around said main housing cooperating with said main housing to define a second chamber, liquid filling said chambers, normally closed valve means between said first chamber and said second chamber, said plunger being formed with cam means engageable with said valve means for opening said valve means and establishing communication between said chambers when said plunger moves to a predetermined position.

7. A liquid spring comprising a main housing formed with a longitudinal cavity, a plunger axially movable relative to said main housing projecting into said cavity, a liquid seal between said main housing and plunger cooperating with said main housing and plunger to define a first chamber, an annular housing around said main housing, fluid seals between the ends of said annular housing and said main housing cooperating with said housings to define a second chamber, liquid filling said chambers, a port connecting said chambers, a valve seat around said port, valve means resiliently urged into engagement with said seat normally isolating said chambers, said plunger being formed with cam means engageable with said valve means for moving said valve means away from said seat and establishing communication between said chambers when said plunger moves to a predetermined position.

8. A liquid spring comprising a main housing formed with a longitudinal cavity, a plunger axially movable relative to said main housing projecting into said cavity, a liquid seal between said main housing and plunger cooperating with said main housing and plunger to define a first chamber, a second housing around said main housing to define a second chamber, liquid filling said chambers, normally closed valve means between said first chamber and said second chamber, said plunger being formed with a damper head engaging the walls of said first chamber and restricted orifices communicating between opposed sides of said damper head, a fluid seal between said damper head and the walls of said first chamber whereby movement of said plunger in said first chamber causes displacement of liquid therein from one side of said damper head to the other side thereof through said restricted orifices, said plunger also being formed with cam means engageable with said valve means for opening said valve means and establishing communication between said chambers when said plunger moves to a predetermined position.

References Cited in the file of this patent
UNITED STATES PATENTS

| | | |
|---|---|---|
| 2,243,782 | Thornhill | May 27, 1941 |
| 2,333,096 | Dowty | Nov. 2, 1943 |
| 2,366,248 | Focht | Jan. 2, 1945 |
| 2,445,139 | Gret | July 13, 1948 |
| 2,618,478 | Conway | Nov. 18, 1952 |
| 2,643,112 | Smith | June 23, 1953 |